United States Patent [19]

Fay et al.

[11] 3,781,089

[45] Dec. 25, 1973

[54] NEUTRAL DENSITY FILTER ELEMENT WITH REDUCED SURFACE REFLECTION

[75] Inventors: Robert J. Fay; John R. Cicotta, both of Rochester, N.Y.

[73] Assignee: Eastman Kodak Company, Rochester, N.Y.

[22] Filed: Aug. 2, 1971

[21] Appl. No.: 168,326

[52] U.S. Cl. ............ 350/164, 117/33.3, 117/71 R, 350/314
[51] Int. Cl. .................. G02b 5/28, B32b 15/04
[58] Field of Search............ 350/164, 314, 165–166; 117/33.3, 71 R, 106 R

[56] References Cited
UNITED STATES PATENTS

| | | | |
|---|---|---|---|
| 2,590,906 | 4/1952 | Tripp | 350/164 |
| 2,799,600 | 7/1957 | Scott | 117/211 |
| 2,845,838 | 8/1958 | Lindberg et al. | 88/14 |
| 2,338,234 | 1/1944 | Dimmick | 117/106 |
| 3,033,701 | 5/1962 | Wozniak | 117/33.3 |
| R26,390 | 5/1968 | Vess et al. | 95/64 |
| 3,649,359 | 3/1972 | Aptel et al. | 117/33.3 |

FOREIGN PATENTS OR APPLICATIONS

| | | | |
|---|---|---|---|
| 1,087,828 | 8/1960 | Germany | 350/314 |

OTHER PUBLICATIONS

Baumeister, P. W. "Notes on Multilayer Optical Filters," Institute of Optics, U. of Rochester, N.Y. 1963, P. 20–16, 20–77

Hass, G., et al. "Preparation of Thin Films" in Methods of Experimental Physics" Vol. 6A, P. 126, (Academic Press, 1959) QC 176 L3

Turner, A. "Some Current Developments in Multilayer Optical Films in Le Journal de Physique et le Radium," 11(2), pp 444–460, July 1950 QC1 J8

Ullrich, O. A. "Optical Coatings" in Vapor Deposition Powell et al. eds. p. 561 John Wiley & Sons, 1966. TS 695 p6.

Primary Examiner—William D. Martin
Assistant Examiner—William H. Schmidt
Attorney—W. H. J. Kline et al.

[57] ABSTRACT

A neutral density filter element for use with photographic apparatus is formed by depositing alternate layers of a metal or metal alloy and a dielectric on a transparent substrate, to a predetermined optical density or reflectivity respectively. The initial and final layers are of the metal or metal alloy. The dielectric layer has a lower index of refraction than the metal or metal alloy layer. In the preferred embodiment Inconel is used as the metal alloy layer and silicon monoxide as the dielectric layer.

4 Claims, 2 Drawing Figures

PATENTED DEC 25 1973　　　　　　　　　　　3,781,089

ROBERT J. FAY
JOHN R. CICOTTA
INVENTORS

BY Robert F Brothers
H.H.J. Kline
ATTORNEY & AGENT

NEUTRAL DENSITY FILTER ELEMENT WITH REDUCED SURFACE REFLECTION

BACKGROUND OF THE INVENTION

1. Field of the Invention

The present invention relates to neutral density filter elements and in particular to an anti-reflection coating and coating method for use in producing such a filter element.

2. Description of the Prior Art

Increases in the effective range of photographic cameras by broadening the range of apertures available for picture taking have been accompanied by an increase in undesirable diffraction effects, particularly when the aperture may be narrow and elongated. One method for reducing such undesirable diffraction effects is to insert a neutral density filter element into the optical axis of the camera. Filter elements formed by the deposition of a metal or metal alloy layer onto a substrate are particularly useful in this regard in that light attenuation is achieved by absorption and reflection rather than by absorption and scattering. Thus, the filter element does not destroy the image forming characteristics of the camera's optical system. However, filter elements consisting of a metal or metal alloy layer on a substrate are characterized by high reflectivity, which may result in unwanted ghost images at the film plane of the camera. The use of faster speed films to achieve available light photography under a broader range of light conditions has accentuated this problem since these films utilize narrower apertures for given light conditions and are, in addition, more sensitive to unwanted ghost images.

SUMMARY OF THE INVENTION

It is an object of the present invention to provide an improved anti-reflection coating.

It is still another object of the invention to provide an anti-reflection coating which may be conveniently and economically produced.

These, and other objects, are accomplished according to the invention by providing a neutral density filter element which consists of alternate layers of a metal or metal alloy and a dielectric material, with the initial and final layers being a metal or metal alloy.

In a preferred embodiment of the method of the invention, the filter element is made by the vacuum deposition of alternate layers of a metal alloy marketed under the tradename Inconel and containing approximately 79.5 percent nickel, 13 percent chromium and 6.5 percent iron and a dielectric material such as silicon monoxide.

The invention and its objects and advantages will become more apparent in the detailed description of the preferred embodiment presented below.

BRIEF DESCRIPTION OF THE DRAWINGS

In the detailed description of the preferred embodiment of the invention presented below, reference is made to the accompanying drawings in which.

DETAILED DESCRIPTION OF THE PREFERRED EMBODIMENT

Because coating apparatus is well known, the present description will be directed in particular to apparatus forming part of, or cooperating more directly with, coating apparatus in accordance with the present invention. It is to be understood that elements of apparatus not specifically shown or described may take various forms well known to those skilled in the art.

Figure 1:
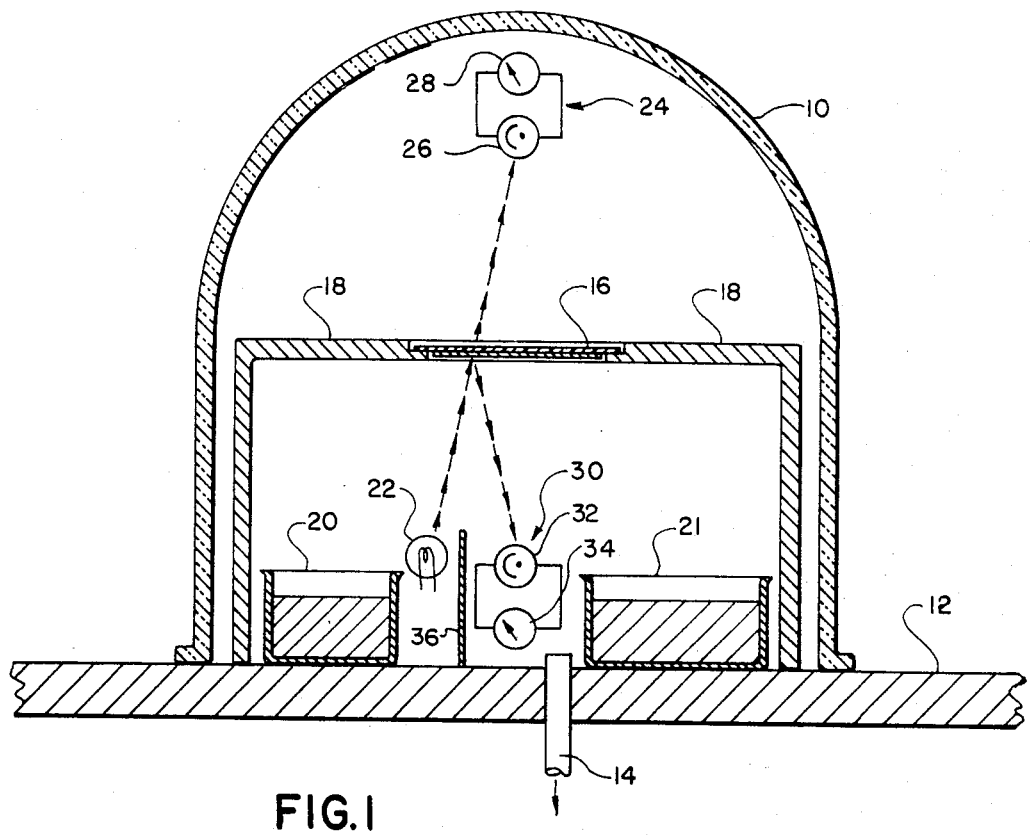
FIG. 1 shows a schematic view of apparatus used in carrying out the coating method of this invention.

Referring first to FIG. 1, a bell jar 10 is placed on and makes an airtight seal with a base plate 12. A vacuum may be obtained in bell jar 10 by means of a vacuum pump (not shown) having its exhaust port connected through a vacuum line 14 in base plate 12. A substrate 16 which is to be coated in accordance with this invention may be supported within bell jar 10 by a pair of support arms 18. Substrate 16 is positioned so that a thin layer may be coated upon substrate 16 from either one of a pair of crucibles 20 and 21. In one crucible 20 is placed a spectrally neutral metal or metal alloy with a relatively high index of refraction, such as Inconel. In the other crucible 21 is placed a dielectric material which has a lower index of refraction than the metal or metal alloy, such as silicon monoxide.

The amount of material deposited from each of crucibles 20 and 21 is controlled by means of a density monitoring device such as is well known in the art. A light source 22 is positioned so as to direct a light beam towards substrate 16. As a coating is formed on substrate 16, a portion of the light beam will be reflected back towards base plate 12 as may be seen in FIG. 1 while the attenuated light beam will pass through substrate 16. A first optical detector 24, consisting of a light responsive device 26 and an indicator 28, is positioned above substrate 16 so as to monitor the attenuated beam of light passing through substrate 16. A second optical detector 30, consisting of a light responsive device 32 and an indicator 34, is positioned adjacent to base plate 12 so as to monitor the reflected light beam. An opaque shield 36 is positioned between light source 22 and optical detector 30 so as to minimize the sensitivity of detector 30 to light passing directly to detector 30 from light source 22.

To form the anti-reflection coating of this invention, a substrate 16 is placed upon holders 18 within bell jar 10. A vacuum is then established within bell jar 10 by means of vacuum line 14, which is preferably at a pressure less than $1 \times 10^{-4}$ torr. Crucible 20 will now be activated so that the Inconel contained therein begins to evaporate. As the Inconel evaporates, a thin layer of Inconel will be formed upon substrate 16. Evaporation is continued until an optical density of approximately 0.25 is achieved as indicated by optical detector 24, at which time evaporation from crucible 20 is halted. Crucible 21 is now actuated so that evaporation of the silicon monoxide contained therein begins. As a thin layer of silicon monoxide is deposited upon the Inconel layer already on substrate 16, the reflected light is monitored by detector 30 until reflection by the coating is reduced to a minimum, whereupon the evaporation of silicon monoxide is terminated. Crucible 20 is then reactivated and an additional layer of Inconel is deposited upon the silicon monoxide layer on substrate 16 until the optical density of the element reaches the desired level, for example 0.90, as monitored by detector 24. Evaporation of Inconel is then terminated. Crucible 21 is then reactivated so that evaporation of silicon monoxide is begun once more and continued until the reflected light as indicated by detector 30 is again reduced to a minimum. The final step is to reactivate crucible 20, thereby depositing a third layer of Inconel on substrate 16, which is continued until the desired optical density of 0.90 is again obtained as indicated by detector 24.

Figure 2:
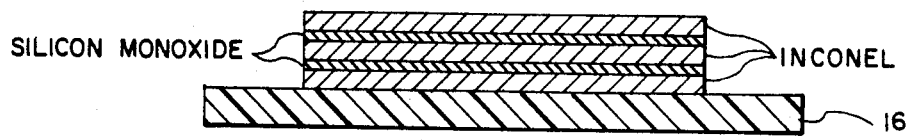
FIG. 2 is a cross-sectional view of a filter element incorporating the anti-reflection coating of this invention.

The neutral density filter element produced by this method is illustrated in FIG. 2. As may be seen, successive layers of Inconel and silicon monoxide are formed on substrate 16, with an Inconel layer being adjacent to substrate 16 and also being the final layer placed upon the coating. While the use of Inconel and silicon monoxide is the preferred embodiment of this invention, other materials may be used for the attenuating and anti-reflection layers. In particular, any spectrally neutral metal or metal alloy may be used to produce the light attenuating layers in this coating. Moreover, any dielectric material which has a lower index of refraction than the metal or metal alloy used in the light attenuating layers may be used to produce the anti-reflection layers.

The invention has been described in detail with particular reference to a preferred embodiment thereof, but it will be understood that variations and modifications can be effected within the spirit and scope of the invention.

We claim:

1. A neutral density filter element having a predetermined optical density; said filter element comprising a transparent substrate and a multilayer coating deposited on said substrate, said multilayer coating comprising at least five alternate layers of a metal alloy and a dielectric material, the layer adjacent to said substrate being formed of said metal alloy, the index of refraction of said dielectric material being lower than that of said metal alloy, the number of layers of said metal alloy being one more than the number of layers of said dielectric material, the total thickness of said layers of said metal alloy being selected to reduce the transmission of said filter element to said predetermined optical density and the thickness of each layer of said dielectric being selected to reduce the reflectance of the preceding layers of said filter element to a minimum.

2. A neutral density filter element as in claim 1, wherein said metal alloy comprises 79.5 percent nickel, 13 percent chromium and 6.5 percent iron.

3. A neutral density filter element as in claim 1, wherein said dielectric material is silicon monoxide.

4. A neutral density filter element having a predetermined optical density; said filter element comprising a transparent substrate and a multilayer coating deposited thereon, said multilayer coating comprising alternate layers of a metal alloy and silicon monoxide, said metal alloy comprising 79.5 percent nickel, 13 percent chromium and 6.5 percent iron; said layer immediately adjacent to said substrate being a layer of said metal alloy; the total number of layers being at least five; there being one more layer of said metal alloy than of said silicon monoxide; the total thickness of said layers of metal alloy being selected to reduce the transmission of said filter element to said predetermined optical density and the thickness of each layer of said silicon monoxide being selected to reduce the reflectance of the preceding layers of said filter element to a minimum.

* * * * *